United States Patent

Im et al.

[11] Patent Number: 4,754,985
[45] Date of Patent: Jul. 5, 1988

[54] LUGGAGE CARRIER

[76] Inventors: Byung-Do Im, 3038 Bain Bridge Ave., Bronx, N.Y. 10467; George Spector, 233 Broadway, RM 3815, New York, N.Y. 10007

[21] Appl. No.: 920,989
[22] Filed: Oct. 20, 1986
[51] Int. Cl.$^4$ .............. B62B 3/02; B62B 3/04
[52] U.S. Cl. .................. 280/40; 280/655; 280/47.29
[58] Field of Search ........... 280/40, 651, 654, 655, 280/47.29

[56] References Cited

U.S. PATENT DOCUMENTS

| | | | |
|---|---|---|---|
| 1,409,838 | 3/1922 | Emery et al. | 280/40 |
| 3,041,026 | 6/1962 | Wilson | 280/654 X |
| 3,043,603 | 7/1962 | Major, Sr. | 280/40 |
| 4,037,858 | 7/1977 | Adams | 280/47.29 X |
| 4,315,632 | 2/1982 | Taylor | 280/40 |
| 4,401,319 | 8/1983 | Kazmark | 280/655 |
| 4,407,521 | 10/1983 | Zeitlin | 280/655 |
| 4,431,211 | 2/1984 | Carrigan | 280/655 |
| 4,506,897 | 3/1985 | Libit | 280/40 |
| 4,523,773 | 6/1985 | Holtz | 280/654 |

FOREIGN PATENT DOCUMENTS

| | | |
|---|---|---|
| 1509040 | 1/1968 | France . |
| 1406272 | 9/1975 | United Kingdom . |
| 1568268 | 5/1980 | United Kingdom . |
| 2099766A | 5/1982 | United Kingdom . |

Primary Examiner—David M. Mitchell
Assistant Examiner—Tamara L. Finlay

[57] ABSTRACT

A luggage carrier is provided which allows the wheel assemblies to automatically retract to a coplanar inoperative position when the base support member is lifted up, thus reducing the luggage carrier into a narrower area when placed in storage.

3 Claims, 1 Drawing Sheet

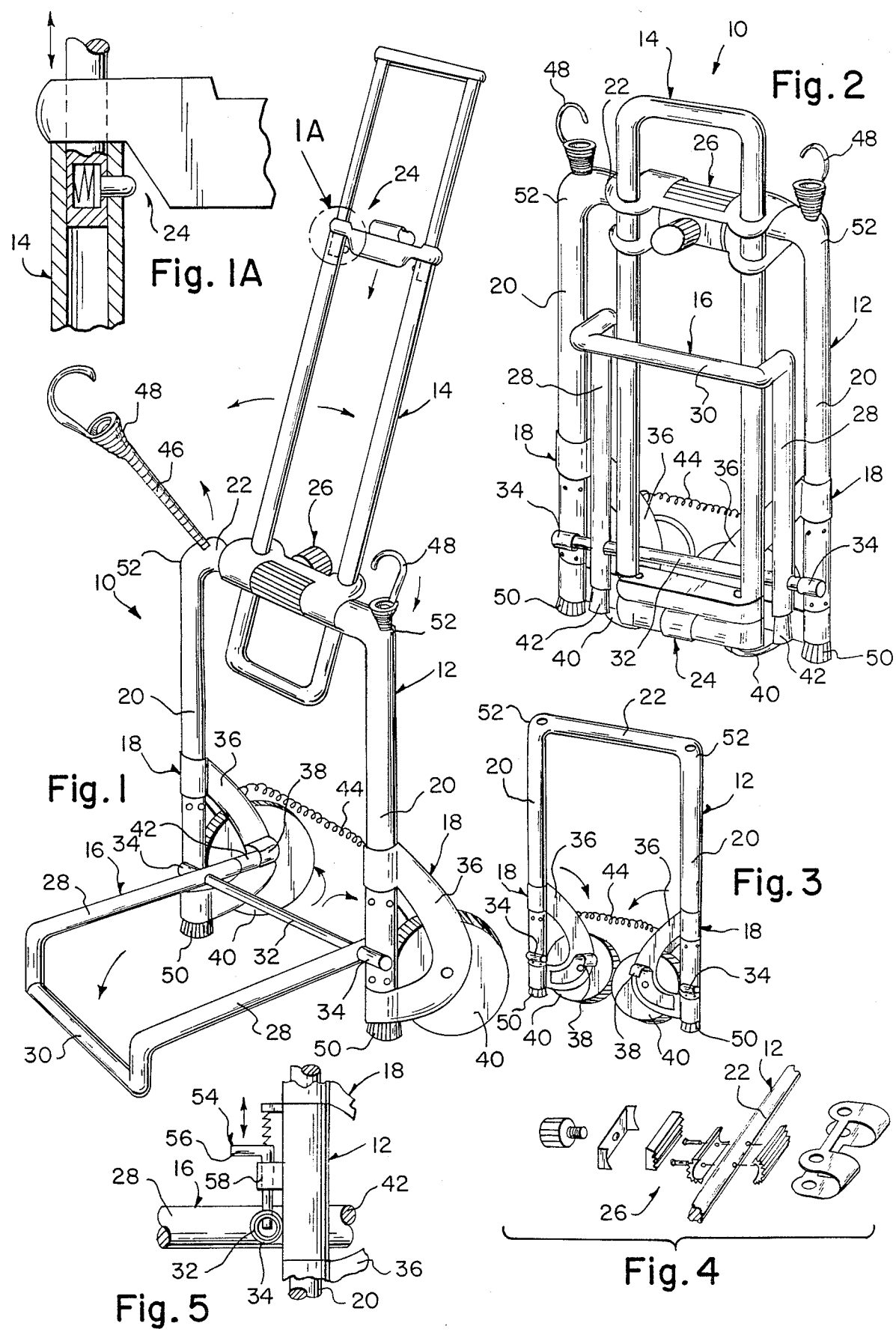

LUGGAGE CARRIER

BACKGROUND OF THE INVENTION

The instant invention relates generally to luggage carriers and more specifically it relates to a luggage carrier equipped with inwardly collapsible wheels to facilitate better storage.

Numerous luggage carriers have been provided in prior art that are adapted to be portable and include built-in collapsible features. For example U.S. Pat. Nos. 4,401,319; 4,431,211 and 4,506,897 all are illustrative of such prior art. While these units may be suitable for the particular purpose to which they address, they would not be as suitable for the purposes of the present invention as heretofore described.

SUMMARY OF THE INVENTION

A primary object of the present invention is to provide a luggage carrier that will overcome the shortcomings of the prior art devices.

Another object is to provide a luggage carrier which allows the wheel assemblies to retract automatically to a coplanar position when the base support member is lifted up, thus reducing the luggage carrier to a flat structure when not in use.

An additional object is to provide a luggage carrier that takes less space when transported in a collapsed position which will reduce staining of a persons clothing when lifting the carrier.

A further object is to provide a luggage carrier that is simple and easy to use.

A still further object is to provide a luggage carrier that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention in any open position with the wheel brackets turned out ready for use.

FIG. 1A is an enlarged detail view with parts in cross section of the extendable handle locking mechanism as indicated by numeral 1A in FIG. 1.

FIG. 2 is a perspective view of the invention in a collapsed position with the wheel brackets turned in ready for storage.

FIG. 3 is a perspective view of just the upright frame member of the invention showing the wheel brackets in greater detail turned in.

FIG. 4 is an exploded perspective view of the parts of the pivotable locking mechanism for the handle.

FIG. 5 is a side view with parts broken away of a modification showing a locking mechanism for keeping the base support member down and the wheel brackets turned out ready for use.

DETAILED DESCRIPTION OF THE PREFERRED EMBODIMENTS

Turning now descriptively to the drawings, in which similar reference characters denote similar elements throughout the several views, FIGS. 1 and 2 illustrate a luggage carrier 10 consisting generally of an upright frame member 12, a handle assembly 14 affixable to the frame member 12 and projecting therefrom. A base support member 16 is pivotably carried by the frame member 12 and a pair of wheel assemblies 18 are for transporting the luggage carrier 10. Each of the wheel assemblies 18 is pivotly connected to the frame member 12 and are moved from an operative to an inoperative position. The wheel assemblies 18 are automatically moved from the operative to the inoperative position responsive to upward pivotal movement of the base support member 16.

The upright frame member 12 is an inverted generally U-shaped tubular rod that has a pair of parallel side arms 20 and a connecting horizontal extending portion 22. The handle assembly 14 is extendable, collapsible at 24 (see FIG. 1A) and pivotly locked at 26 (see FIG. 4) to the connecting horizontal extending portion 22 of the frame member.

The base support member 16 is a generally U-shaped tubular rod having a pair of parallel side sections 28, an offset connecting end section 30 and an axle rod 32 extending through the side sections 28 and pivotable at 34 between the side arms 20 of the frame member 12. Each of the wheel assemblies 18 includes a bracket 36 having a hooked portion 38 and a wheel 40 rotatable on the bracket 36. The bracket is pivotable on one of the side arms 20 on the frame member 12 in which free end 42 of one of the side sections 28 of the base support member 16 can engage with the hooked portion when the base support member 16 is down to keep the wheel assembly 18 in the operative position as shown in FIG. 1.

An elongated spring 44 extends between the brackets 36 of the wheel assemblies 18 whereby when the base support member 18 is placed in an upward position, the free ends 42 of the side sections 28 will disengage from the hooked portions 38 allowing the spring to pull the wheel assemblies 18 inwardly towards each other to be flush with the side arms 20 of the frame member 12 as shown in FIGS. 2 and 3.

The luggage carrier 10 further contains a pair of elongated resilient retaining elastic cords 46. Each of the cords 46 has a hook member 48 at one end and is attached at other end to bottom 50 of one of the side arms 20 of the frame member 12 so that the cord 46 will extend upwardly through the side arm 20 with the hook member 48 sitting on top corner 52 of the horizontal extending portion 22. The hook member 48 can be attached to the base support member 16 to hold luggage (not shown) against the frame member 12.

FIG. 5 shows a locking mechanism 54 for keeping the base support member 16 down and the wheel assemblies 18 in the operative position. The locking mechanism 54 consists of a spring biased lever rod 56 slideably mounted at 58 to one of the side arms 20 of the frame member 12 above the axle rod 32 and pivot 34 of the base support member 16. The lever rod 56 will extend into the axle rod 32 when the base support member 16 is down. The lever rod 56 must be pulled up manually to release the base support member 16.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A luggage carrier comprising:
   (a) an upright frame member;
   (b) a handle assembly affixable to said frame member and projecting therefrom;
   (c) a base support member pivotably carried by said frame member;
   (d) a pair of wheel assemblies for transporting said luggage carrier, each of said wheel assemblies having means for pivotly connection to said frame member whereby said assemblies are moveable from an operative position to an inoperative position; and
   (e) further means for moving said wheel assemblies from said operative to said inoperative position responsive to upward pivotal movement of said base support member, further comprising:
   (f) said upright frame member being an inverted generally U-shaped tubular rod having a pair of parallel side arms and a connecting horizontal extending portion;
   (g) said handle assembly having adjusting means for extending collapsing and pivotly locking said handle assembly to said connecting horizontal extending portion of said frame member;
   (h) said base support member being a generally U-shaped tubular rod having a pair of parallel side sections each having a free end at one end and at their opposite ends an offset connecting end section, an axle rod extending through said side sections and pivotably mounted on said side arms of said frame member;
   (i) each of said wheel assemblies including a bracket having a hooked portion and a wheel rotatable on said bracket, said bracket pivotable on one of said side arms on said frame member in which said free end of each of said side sections of said base support member can engage with said hooked portion on said bracket when said base support member is down to keep said wheel assembly in said operative position; and
   (j) said moving means being an elongated spring extending between said brackets of said wheel assemblies whereby when said base support member is placed in an upward position, said free ends of said side sections will disengage from said hooked portions allowing said spring to pull said wheel assemblies inwardly towards each other to be flush with said side arms of said frame member.

2. A luggage carrier as recited in claim 1, further comprising a pair of elongated resilient retaining elastic cords, each of said cords having an external hook member at one end and attached at an opposite end to one of said side arms so that said cord can extend externally and be attached to said base support member to hold luggage against said frame member.

3. A luggage carrier as recited in claim 2, further comprising a locking mechanism for keeping said base support member down and said wheel assemblies in said operative position, said locking mechanism comprising a spring biased lever rod slideably mounted on one of said side arms said lever rod being moveable to engage coacting means on said axle rod for locking said base support member in the operative luggage carrying position.

* * * * *